May 12, 1964

P. ZUPPIGER 3,132,538

TWO-SPEED GEAR BOX HAVING PLANET GEAR TRAIN

Filed July 17, 1962

United States Patent Office 3,132,538
Patented May 12, 1964

3,132,538
TWO-SPEED GEAR BOX HAVING
PLANET GEAR TRAIN
Paul Zuppiger, Carouge, Geneva, Switzerland, assignor to
Automobiles M. Berliet, Lyon, France, a firm
Filed July 17, 1962, Ser. No. 210,455
Claims priority, application Switzerland July 17, 1961
6 Claims. (Cl. 74—785)

This invention relates to a two-speed gear box and is concerned particularly with a two speed gear box having a planet gear train, the ring gear of which is adapted to be made fast either with the sun pinion or gear by means of a clutch or with a fixed part of the box by means of a brake assembly.

Such gear boxes are found, for example, in automobile vehicles where they are used as additional gear boxes intended for step-up transmission, for example in arrangements known as "overdrives." These are known in the mechanical industry, generally in the form of elements permitting a stepping down in speed. These gear boxes are designed to serve as a transmission member and not as a stopping member.

In accordance with the invention there is provided a two-speed gear box having a planet gear train, the ring gear of which is adapted to be made fast either with the sun pinion or gear by means of a clutch or with a fixed part of the box by means of a brake assembly which is axially acting and comprises a locking plate and a braking plate, both plates being fixed angularly and movable axially while being positioned one each side of a driven plate which is angularly held with respect to the ring gear but which is axially movable, the arrangement being such that the locking plate and the braking plate may cooperate when required with the driven plate, and such that the clutch and the braking plate may be actuated by common control means, the actuation of which has the effect of urging the braking plate against the driven plate whilst simultaneously freeing the clutch, the de-actuation of which displaces the braking plate from the driven plate whilst simultaneously engaging the clutch, the locking plate being subjected to second control means which may occupy two positions, the first enabling the locking plate to be held in a retracted rest position, while the second position permits the locking plate to be urged against the driven plate.

Figure 1:
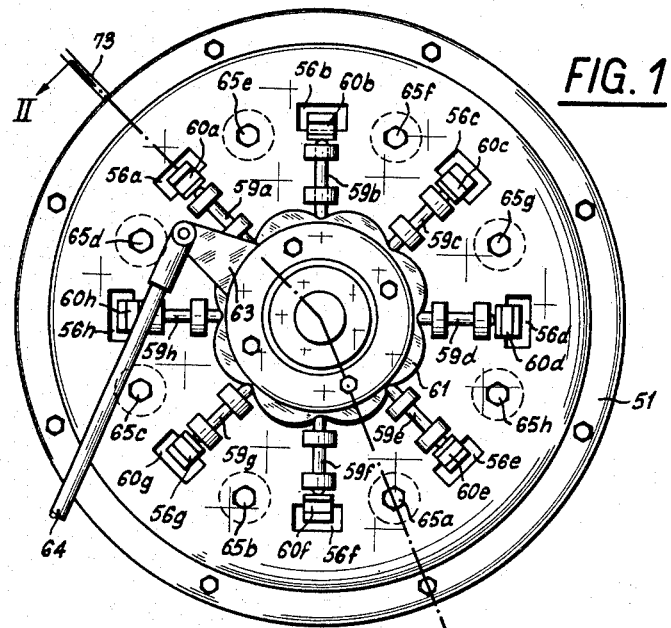
Figure 2:
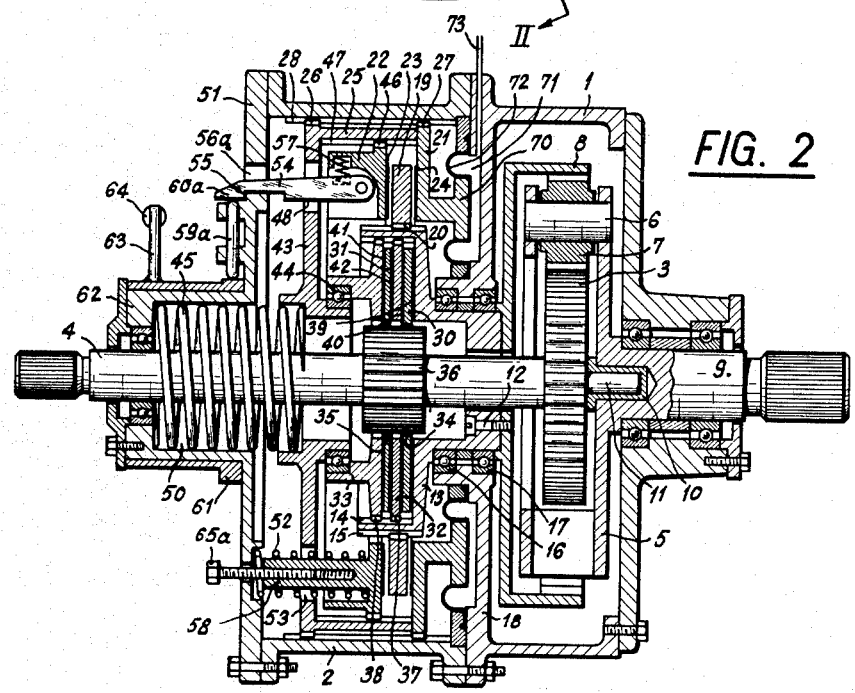

For a better understanding of the invention and to show how the same may be readily carried into effect reference will now be made, by way of example, to the accompanying drawing in which:

FIGURE 1 is a transverse view of an embodiment, and
FIGURE 2 is a longitudinal section thereof on the line II—II of FIGURE 1.

As can be seen from FIGURE 2, the gear box comprises two main assemblies, namely, a planet gear train contained in a casing 1 and a brake and clutch assembly contained in an extension 2 of the casing. The planet gear train comprises a sun pinion or gear 3, which is fixedly secured to an input shaft 4, a planet carrier 5 comprising shafts such as 6, to each of which is rotatably attached a planet gear 7. Each planet gear 7 meshes simultaneously with the sun gear 3 and a ring gear 8. The planet carrier 5 is extended by an output shaft 9 which includes a bearing 10 in which the end 11 of the input shaft 4 is adapted to rotate.

The ring gear 8 is secured by means of bolts, such as 12, to a hollow hub 13 carrying internal grooves 14 and external grooves 15 parallel with its axis. Roller bearings 16 and 17 enable this hollow hub 13 to rotate inside the wall 18 of the casing 1. Disposed outside this hollow hub 13 is a brake which is adapted to stop the ring gear by making it fast with the casing extension 2, while a clutch adapted to make it fast with the sun gear 3 is disposed inside the hub. The brake comprises a driven plate 19 provided with internal teeth 20 engaged in the external grooves 15 of the hollow hub 13 so as to be keyed angularly therewith whilst being able to be displaced axially. This driven plate 19 is enclosed on either side by a braking plate 21 and a locking plate 22, each provided with linings 23 and 24, respectively, having a high coefficient of friction. The braking plate 21 forms one of the flanges of a sliding assembly or drum 25, the side wall of which carries external teeth 26 and 27 which are engaged in grooves 28 machined in the internal face of the wall of the casing extension 2, so that this sliding assembly or drum 25 can move axially whilst being secured against angular turning movement. Located inside the hollow hub 13 is a stack of clutch plates comprising driving discs 30 and 31 and a driven disc 32 arranged in sandwich formation. A clutch plate 33 acts on all the discs. The driving discs 30 and 31 comprise internal ribs 34 and 35, respectively, which slide in grooves formed in the grooved member 36 fixedly secured to the input shaft 4. The driven disc or plate 32 and the clutch plate 33 are formed with ribs 37 and 38, respectively, which slide in the internal grooves 14 of the hollow hub 13. Consequently, the discs or plates 30, 31 and 32 and the clutch plate 33 can slide axially but are respectively held angularly with the sun gear 3 for the driving discs 30 and 31 and with the ring gear 8 for the driven disc 32 and the clutch plate 33. Linings 39, 40 and 41, 42, respectively, with a high coefficient of friction, are disposed on the two faces of each of the driving discs 30 and 31. This clutch plate 33 has an axial position fast with that of the second flange 43 of the sliding assembly or drum 25, but it can turn because of a roller bearing 44. A spring 45 acting on the bottom of a seating 50 formed in a boss 62 of the cover 51 of the casing extension 2 tends to maintain the clutch engaged and the braking plate 21 spaced from the driven disc 19, in the absence of any external opposing force. The locking plate 22 is formed with external grooves 46 which are engaged with ribs 47 disposed inside the lateral face of the sliding drum 25. It is thus capable of movement axially relatively to this sliding drum, but is prevented from turning. Springs which are identical with the spring shown at 52 are distributed around the locking plate 22; these springs extend through the flange 43 of the sliding drum 25 by way of holes 53 and bear on the cover 51 of the casing extension 2. They tend to hold the locking plate 22 against the driven plate 19. The locking plate 22 also carries a latching system formed of a series of circularly arranged hooks. These hooks, one of which is indicated at 54 in FIGURE 2, extend through the flange 43 of the sliding drum 25 by way of holes 48. They are all identical and the remainder of the description relates to the single hook 54 shown in FIGURE 2. The edge 55 of the nose $60_a$ of this hook 54 is adapted, under the action of a spring 57, to engage in the edge of an opening 56 formed in the cover 51 of the casing extension 2, this action being under the effect of a spring 57. It is obvious that, as shown in FIGURE 1, an opening $56_{a\ to\ h}$ is necessary for each nose $60_{a\ to\ h}$. These hooks are of such dimensions that they are able to engage in the holding position even if the locking plate 22 is urged rearwardly into its rest position. This retracted rest position is defined by a series of stop rods, which are all identical with the stop rod 58, which is the only one which can be seen in FIGURE 2 and which is fixed on the locking plate 22, coaxially with the spring 52. The plungers $59_{a\ to\ h}$ (FIGURE 1) act on the noses $60_{a\ to\ h}$ of the latching hooks and are moved by the cam 61 which can rotate around the boss 62 of the cover 48 of the casing extension 2 under the action of a lever 63 and a locking control means 64. A cover, not shown in the drawing is adapted to be fitted on the base 51 of the casing extension 2 in order to protect the plungers $59_{a\text{ to }h}$ and the cam 61.

The flange 21 of the sliding drum 25 is fast with the movable wall 70 of an annular deformable chamber 71, which is made fluid-tight by a diaphragm 72 and into which a fluid under pressure can be introduced through the pipe 73. The pressure of this fluid is so chosen that the opposing force which it exerts on the wall 70 is higher than the sum of the force exerted by the spring 45 and by the springs such as 52.

A stand-by device is provided in the form of bolts $65_{a\text{ to }h}$, which are adapted to be screwed into the stop rods such as 58.

The operation of the two-speed gear box which has just been described is as follows:

With the locking plate 22 held in its rest position by the latching system, the expulsion of the fluid under pressure contained in the chamber 71 and under the effect of the gear-changing control means causes the displacement of the sliding drum 25 under the action of the spring 45 into a first position which corresponds to the engagement of the clutch and the release of the brake. The ring gear 8 of the planet gear train is then made fast with the sun pinion 3, this causing the planet carrier 5 to turn at the same speed as the sun pinion or gear and gives a first transmission ratio equal to 1, between the input shaft 4 and the output shaft 9.

The admission of the fluid under pressure into the chamber 71 urges the sliding drum 25 into a second position, where it causes the release of the clutch and the application of the brake by locking the driven plate 19 between the locking plate 22, serving as a stop, and the braking plate 21. The ring 8 of the planet gear train is thus immobilised and the planet carrier 5 turns at a reduced speed with respect to the sun gear 3, this giving a second transmission ratio smaller than 1 between the input shaft 4 and the output shaft 9.

If the latching system is open, under the action of the locking control system 64, the lever 63, the cam 61 and the plungers $59_{a\text{ to }h}$, the springs such as 52 cause the locking plate 22 to press the driven plate 19 constantly against the braking plate 21. As a result, the driven plate 19 is stopped, even when the subsequent discharge of the fluid from the chamber 71 causes the engagement of the clutch by the displacement of the sliding drum 25 into its second position. At this moment, the gear box is locked, as it were, by simultaneous engagement of the two transmission ratios.

The unlocking of the gear box is obtained by operating the locking control system 64 so as to bring the plungers $59_{a\text{ to }h}$ into their bottom position, and then admitting the fluid under pressure into the chamber 71 by means of the gear-changing control mechanism. The locking plate 22 is then driven by the sliding drum 25 into its rest position, defined by the stop rods 58, and because of the spring 57, this causes the engagement of the latching system formed by the hooks 54. At the same time, the clutch is freed, this engaging the transmission ratio smaller than 1. The latching system having thus been engaged, the gear change is then operated as described above.

As regards the stand-by device, formed by the bolts $65_{a\text{ to }h}$, it is arranged to bring the locking plate 22 into its rest position independently of the gear-changing control means and to keep it in this position independently of the locking control means and the latching system. This operation is effected by screwing the bolts $65_{a\text{ to }h}$ until their heads bear on the cover 51 of the casing 2 and by continuing to screw them so as to bring the locking plate 22 into its rest position.

It will be seen that the gear box forming the subject of the invention has several advantages:

The normal operation for obtaining the locking effect consists in engaging initially the reduction ratio smaller than 1, the effect of which is to reduce the friction forces which are exerted on the noses $55_{a\text{ to }h}$ of the hooks under the effect of the springs 52, and maneuvering the locking control system 64 so as to lift the plungers $59_{a\text{ to }h}$ and engage the reduction ratio equal to 1.

The locking can be obtained, at the expense of a greater effort on the locking control system 64, by directly opening the latching system; the springs such as 52 then project the locking plate 22 towards the driven plate. This is an emergency maneuver, which can for example be used in the event of a breakdown in the speed-changing control mechanism, a leak in the pipelines of the fluid under pressure, etc.

The unlocking is always associated with the engagement, even if only for an instant, of the transmission ratio different from 1, which is quite rational.

The unlocking is not necessarily connected with the operation of the locking control means nor with the correct functioning of the latching system; in actual fact, whenever the transmission ratio different from 1 is engaged, the gear box is unlocked.

The presence of the stand-by device is valuable; it enables the box to be unlocked from outside under any circumstances, particularly when it is necessary to carry out a repair.

A certain number of modifications can be envisaged. Thus, the use of fluid under pressure for creating the opposing force necessary for the operation of the sliding drum 25 can be replaced by the use of an electromagnet.

The hook-type latching system which has been described can be replaced by any other suitable means.

The box can be used in the reverse sense, as a step-up gear box, the shaft 9 serving as input shaft and the shaft 4 as output shaft.

The box can be used in any mechanical application. If it is mounted on automobile vehicles, the locking system with which it is equipped may serve as a "parking" brake; it is in conformity with the legal requirement which exists, namely, that such a brake may be engaged by strictly mechanical means under all circumstances.

What is claimed is:

1. A gear-box comprising a casing; first and second shafts extending into said casing; a planet gear train including a sun gear rotatable with said first shaft, a planet gear meshing with said sun gear and rotatable with said second shaft, and a ring gear meshing with said planet gear and rotatably mounted on said casing; a clutch including a first portion rotatable with said first shaft, and an axially movable second portion rotatable with said ring gear; a brake including a first portion rotatable with said ring gear and a second axially movable non-rotatable portion located to one side of said brake first portion, said axially movable brake second portion and said axially movable clutch second portion forming components of an axially movable assembly for being moved in unison; first biasing means acting on said axially movable assembly normally to hold said brake portions out of engagement and said clutch portions in engagement; selectively operable force responsive means for axially moving said assembly against the action of said first biasing means to disengage said clutch portions and to engage said brake portions; an axially movable non-rotatable locking member located on the other side of said brake first portion from said brake second portion and engageable with said brake first portion; second biasing means for urging said locking member into engagement with said brake first portion; releasable holding means normally holding said locking member out of engagement with said brake first portion against the action of said second biasing means; and selectively operable release means for releasing said holding means, whereby said locking member under the action of said second biasing means engages said brake first portion and locks the latter against rotation.

2. A gear-box according to claim 1, wherein relatively slidable transversely interengaging components interconnect said ring gear and brake first portion together angularly and for said brake first portion to slide axially to reset said releasable holding means in response to operation of said force responsive means.

3. A gear-box according to claim 1, wherein said releasable holding means includes a plurality of latches normally engaged with a portion of said casing and normally holding said locking member out of engagement with said brake first portion against the action of said second biasing means; and said selectively operable release means includes a corresponding plurality of pusher members movably engaging said latches to release said latches, and rotary cam means having lobes movably engaging said pusher members for simultaneously actuating said pusher members and accordingly said latches into latch released positions.

4. A gear-box according to claim 1, wherein said ring gear includes a hollow hub and said clutch first and second portions extend within said hollow hub, said axially movable clutch second portion and said hub having relatively slidable angularly interengaging components for said clutch second portion to be moved axially and rotate with said ring gear; and wherein said brake first portion is externally on said hub, said brake first portion and hub having relatively slidable angularly interengaging components for said brake second portion to slide axially in non-rotatable engagement with said hub for resetting said releasable holding means in response to operation of said force responsive means.

5. A gear-box according to claim 1, further comprising stand-by means engaging said axially movable non-rotatable locking member for moving said member axially out of engagement with said brake first portion against the action of said second biasing means and for maintaining disengagement of said brake first portion and locking member independently of said releasable holding means.

6. A gear-box according to claim 5, wherein said stand-by means includes a plurality of screws, each said screw having a head adapted to bear against said casing and a shank extending through a corresponding opening in said casing and engaging threads in said axially movable locking member for moving said locking member axially.

References Cited in the file of this patent

UNITED STATES PATENTS

| | | |
|---|---|---|
| 990,914 | Shepard | May 2, 1911 |
| 2,507,050 | Roberts | May 9, 1950 |
| 2,851,907 | Normanville | Sept. 16, 1958 |
| 2,870,655 | Rockwell | Jan. 27, 1959 |
| 2,918,832 | Meyers | Dec. 29, 1959 |
| 3,069,929 | Hansen | Dec. 25, 1962 |